US011718371B2

(12) United States Patent
Vigen

(10) Patent No.: US 11,718,371 B2
(45) Date of Patent: Aug. 8, 2023

(54) SNOW VEHICLE

(71) Applicant: Arctic Cat Inc., Thief River Falls, MN (US)

(72) Inventor: David L. Vigen, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 40 days.

(21) Appl. No.: 17/245,792

(22) Filed: Apr. 30, 2021

(65) Prior Publication Data

US 2021/0245837 A1 Aug. 12, 2021

Related U.S. Application Data

(63) Continuation of application No. 16/192,000, filed on Nov. 15, 2018, now Pat. No. 11,027,794.

(60) Provisional application No. 62/586,559, filed on Nov. 15, 2017.

(51) Int. Cl.
B62M 27/02 (2006.01)

(52) U.S. Cl.
CPC ....... B62M 27/02 (2013.01); *B62M 2027/021* (2013.01); *B62M 2027/023* (2013.01); *B62M 2027/025* (2013.01); *B62M 2027/027* (2013.01)

(58) Field of Classification Search
CPC ............ B62M 27/02; B62M 2027/027; B62M 2027/025; B62M 2027/023; B62M 2027/021

USPC .......................................................... 180/190
See application file for complete search history.

(56) References Cited

U.S. PATENT DOCUMENTS

| | | | |
|---|---|---|---|
| 4,535,869 A | 8/1985 | Tsutsumikoshi et al. | |
| 4,620,604 A | 11/1986 | Talbot | |
| 4,688,817 A | 8/1987 | Warier | |
| 5,054,798 A | 10/1991 | Zulawski | |
| 5,474,146 A * | 12/1995 | Yoshioka | B62M 27/02 180/184 |
| 5,586,614 A | 12/1996 | Kouchi et al. | |
| 5,660,245 A | 8/1997 | Marier et al. | |
| 5,727,643 A | 3/1998 | Kawano et al. | |
| 5,755,495 A | 5/1998 | Cook et al. | |
| 5,791,431 A | 8/1998 | Asao et al. | |
| 5,904,217 A * | 5/1999 | Yamamoto | B62D 55/14 180/193 |
| 5,944,133 A | 8/1999 | Eto | |
| 5,996,717 A | 12/1999 | Hisadomi | |
| 6,095,275 A | 8/2000 | Shaw | |
| 6,112,840 A | 9/2000 | Forbes | |
| 6,234,263 B1 | 5/2001 | Boivin et al. | |

(Continued)

FOREIGN PATENT DOCUMENTS

| | | |
|---|---|---|
| CA | 2143383 C | 10/2000 |
| CA | 2321860 C | 10/2006 |

(Continued)

*Primary Examiner* — Kevin Hurley
*Assistant Examiner* — Hosam Shabara
(74) *Attorney, Agent, or Firm* — Billion & Armitage

(57) ABSTRACT

Embodiments of the present disclosure describe a snow vehicle, comprising an engine mounted on a frame, a drive track, a drive train operatively interconnecting the engine with the drive track for delivering propulsive power to the drive track, and exhaust system. The exhaust system is positioned within an interior of the frame of the vehicle.

7 Claims, 22 Drawing Sheets

(56) References Cited

U.S. PATENT DOCUMENTS

| | | |
|---|---|---|
| 6,321,864 B1 | 11/2001 | Forbes |
| 6,382,338 B1 | 5/2002 | Forbes |
| 6,431,301 B1 | 8/2002 | Forbes |
| 6,446,744 B2 | 9/2002 | Wubbolts et al. |
| 6,467,787 B1 | 10/2002 | Marsh |
| 6,626,258 B1 | 9/2003 | Forbes |
| 6,808,034 B2 | 10/2004 | Nakano et al. |
| 6,904,990 B2 | 6/2005 | Etou |
| 7,124,847 B2 | 10/2006 | Girouard et al. |
| 7,124,848 B2 | 10/2006 | Girouard et al. |
| 7,213,669 B2 | 5/2007 | Fecteau et al. |
| 7,448,462 B2 | 11/2008 | Toyochika |
| 7,475,751 B2 | 1/2009 | Pard et al. |
| 7,789,183 B2 * | 9/2010 | Sadakuni ............... B62D 55/10 180/190 |
| 7,815,003 B2 | 10/2010 | Ferrer Almazan |
| 8,127,877 B2 | 3/2012 | Fredrickson et al. |
| 8,910,738 B2 | 12/2014 | Mangum |
| 8,978,794 B2 | 3/2015 | Giese et al. |
| 9,321,509 B2 | 4/2016 | Beavis |
| 9,352,802 B2 | 5/2016 | Sampson |
| 9,643,684 B2 * | 5/2017 | Will ................ B62M 9/06 |
| 9,809,195 B2 | 11/2017 | Giese et al. |
| 9,845,004 B2 | 12/2017 | Hedlund et al. |
| 9,873,485 B2 | 1/2018 | Mangum et al. |
| 10,293,883 B1 * | 5/2019 | Bedard ................ B62M 27/02 |
| 10,493,846 B2 | 12/2019 | Bennett et al. |
| 10,538,262 B2 | 1/2020 | Mangum et al. |
| 10,597,117 B2 * | 3/2020 | LeBlanc ................ B62M 27/02 |
| 10,899,415 B2 | 1/2021 | Mangum et al. |
| 2002/0112909 A1 | 8/2002 | Nishijima |
| 2003/0201128 A1 | 10/2003 | Girouard et al. |
| 2004/0129483 A1 | 7/2004 | Girouard et al. |
| 2005/0194199 A1 | 9/2005 | Marks et al. |
| 2006/0162977 A1 | 7/2006 | Etou |
| 2007/0193715 A1 | 8/2007 | Bergman et al. |
| 2015/0144412 A1 | 5/2015 | Magnum |
| 2015/0197313 A1 | 7/2015 | Vistad et al. |
| 2016/0167722 A1 | 6/2016 | Anderson et al. |
| 2018/0237106 A1 | 8/2018 | Hedlund et al. |
| 2018/0273142 A1 | 9/2018 | Mangum et al. |
| 2019/0047652 A1 | 2/2019 | Laberge et al. |
| 2022/0250715 A1 * | 8/2022 | LeBlanc ................ B62J 41/00 |

FOREIGN PATENT DOCUMENTS

| | | |
|---|---|---|
| CA | 2345490 C | 2/2007 |
| CA | 2555108 C | 6/2009 |
| CA | 2555039 C | 12/2009 |
| CA | 2561337 C | 12/2010 |
| CA | 2797535 A1 | 5/2013 |
| EP | 0391282 B1 | 11/1992 |
| EP | 1056639 B1 | 6/2003 |
| WO | 0050295 A1 | 8/2000 |
| WO | 2017031591 | 3/2017 |
| WO | 2017031592 | 3/2017 |

* cited by examiner

SNOW VEHICLE

CROSS-REFERENCE TO RELATED TO APPLICATION(S)

This application is a Continuation of U.S. application Ser. No. 16/192,000 filed on Nov. 15, 2018, which claims benefit of U.S. Provisional Application No. 62/586,559, filed on Nov. 14, 2017 and which application is incorporated herein by reference. A claim of priority is made.

BACKGROUND

In addition to traditional snowmobiles, an alternative snow vehicle is the snow bike or snow cycle. These vehicles are generally smaller and lighter than snowmobiles. Snow cycle designs are typically based upon off-road motorcycles with the front wheel replaced by a ski and the rear wheel replaced by an endless loop traction belt, commonly called a track. Snow bikes typically have a single steering ski and a relatively narrow track located behind and in line with the single ski.

SUMMARY

Embodiments of the present disclosure describe a snow vehicle, comprising an engine mounted on a frame, a drive track, a drive train operatively interconnecting the engine with the drive track for delivering propulsive power to the drive track, and exhaust system. The exhaust system is positioned within an interior of the frame of the vehicle.

Embodiments relate to a snow vehicle, comprising an engine mounted on a frame, a drive track, a drive train operatively interconnecting the engine with the drive track for delivering propulsive power to the drive track, and an engine air intake system, positioned above the engine. The air intake system includes a rearward positioned air intake port.

Embodiments also relate to a snow vehicle, comprising an engine mounted on a frame, a drive track, a drive train operatively interconnecting the engine with the drive track for delivering propulsive power to the drive track, an engine air intake system positioned above the engine, and an exhaust system positioned within an interior of the frame of the vehicle. The air intake system includes a rearwardly facing air intake port; and wherein the drive train includes a CVT.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

Snow vehicles, such as snow bikes, are often created as modifications or kits of off-road motorcycles or dirt bikes. The front wheel is temporarily replaced by a ski and the rear wheel by a power track for gripping snow and ice. Such vehicles exceed noise and safety regulations and are therefore often restricted to use on closed courses. In snow vehicle applications, reducing the weight of individual components and overall vehicle weight, without sacrificing durability, function or utility, is an ongoing goal in product design. A lighter vehicle can increase performance and handling, among other characteristics. Embodiments of the present disclosure describe a purpose-built snow vehicle with numerous advantages over current snow vehicles and snow bike kits. Embodiments herein describe a snow vehicle utilizing a continuously variable transmission (CVT) with an air handling system. The snow vehicle includes an exhaust system positioned entirely within the chassis and tunnel of the vehicle, to prevent any contact with a user or their clothing. The snow vehicle further includes a lower center of gravity in the positioning of the vehicle components within the purpose-built frame. The engine is positioned lower and forward, and additional weight, such as one or more gas tanks are further positioned to create the optimal center of gravity for handling and balance.

Embodiments herein describe a dropped fork component that creates a lower weight of the vehicle and additional adjustment of the handlebars. An engine air intake system provides a rear facing air intake for the engine. The purpose-built chassis or frame allows for greater space utilization and a lower center of gravity of the vehicle.

Figure 1:
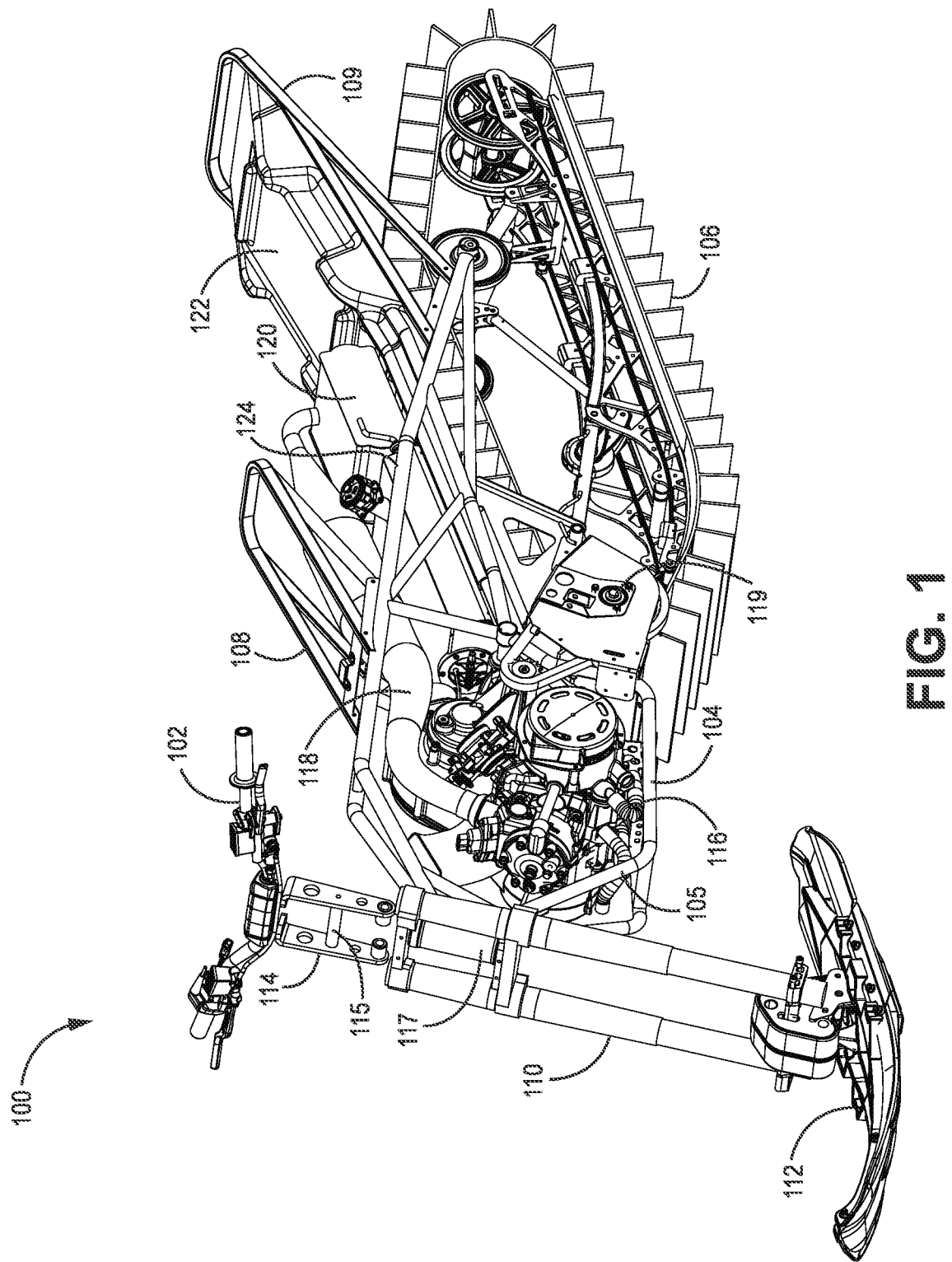
FIG. 1 illustrates a perspective view 100 of a snow vehicle, according to some embodiments.

Referring to FIG. 1, a perspective view 100 of a snow vehicle is shown, according to some embodiments. A chassis or frame 104 supports an engine 116, drive train components, a drive track 106, handlebars 102 and one or more skis 112. The chassis includes a seat frame 108, lower front frame component 105, and integrated bumper 109. Exhaust system 118 connects to muffler 120. The chassis 104 connects to a fork 110, in contact with the one or more skis 112. A drop fork component 114 connects the fork 110 and handlebars 102. Fuel tank 124 is positioned beneath the exhaust system 118 and seat frame 108. Tunnel shroud 122 is positioned in contact with the chassis 104 and above the drive track 106. The track width can be about 10 inches to about 12 inches, about 12 inches to about 13 inches, about 12.5 inches, about 13.5 inches, or about 14 inches wide. A foot peg attachment 119 can be positioned near an exterior surface. Examples of drive track 106 and other embodiments can be found in co-owned U.S. Pat. No. 9,321,509, filed on Dec. 17, 2013 with first named inventor Andrew Beavis and entitled "Snowmobile Skid Frame Assembly", the contents of which are incorporated herein by reference.

Figure 3:
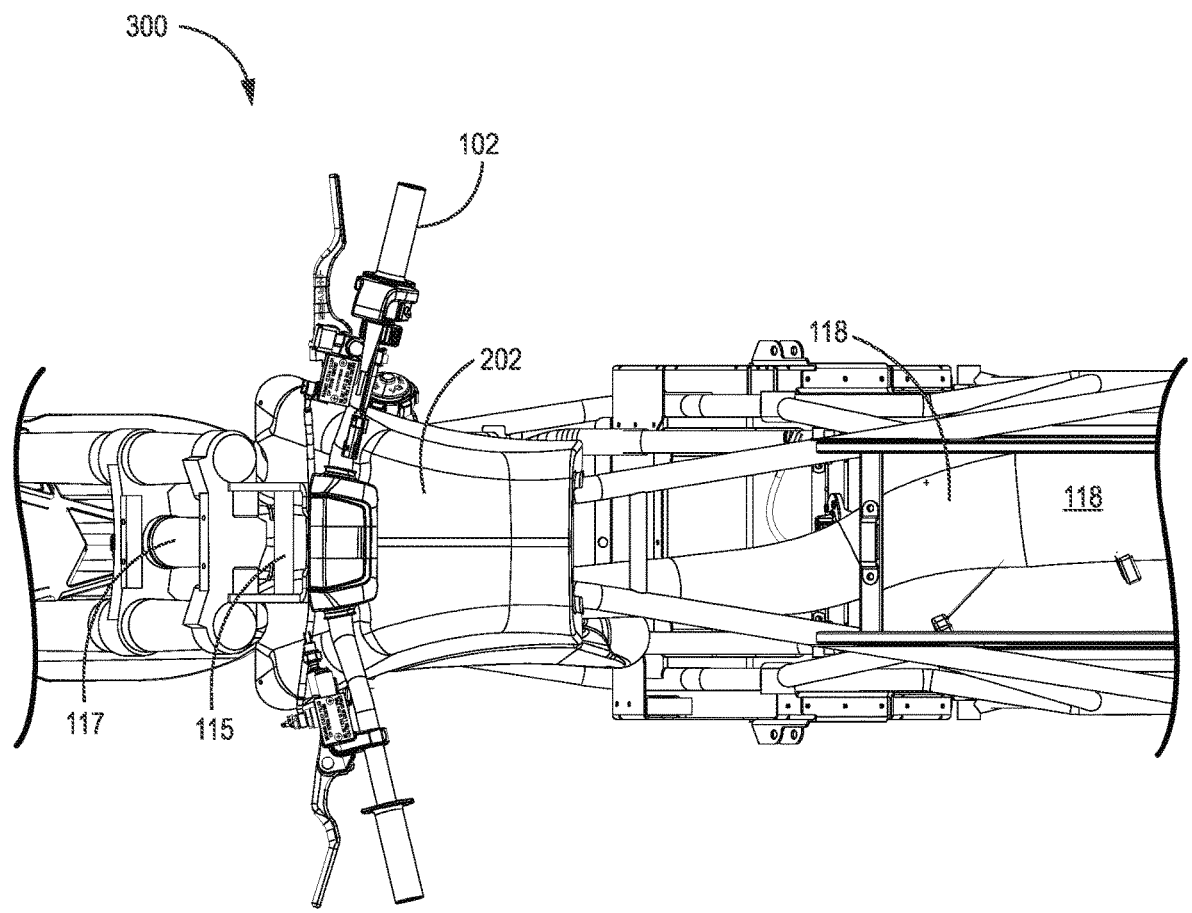
FIG. 3 illustrates a partial top-down view 300 of a snow vehicle with air intake system (engine removed), according to some embodiments.

In some embodiments, the exhaust system 118 is positioned completely within the tunnel and frame 104 of the vehicle. By rotating the position of the engine 116 one hundred eighty degrees from a typical snowmobile or motorcycle configuration, the exhaust port faces a rearward direction. The exhaust system 118 can then be contained in a substantially linear configuration towards the rear of the vehicle and into a muffler 120. The muffler 120 can also be contained within an interior of the frame 104. The exhaust then exits the rear of the vehicle. By positioning the exhaust system 118 completely within the frame 104 and tunnel of the vehicle, a user is protected from incidental contact on the hot surface of the exhaust system 118. A partial top-down view of a snow vehicle is shown in FIG. 3, in which exhaust system 118 runs within the width of the frame 104.

Figure 2:
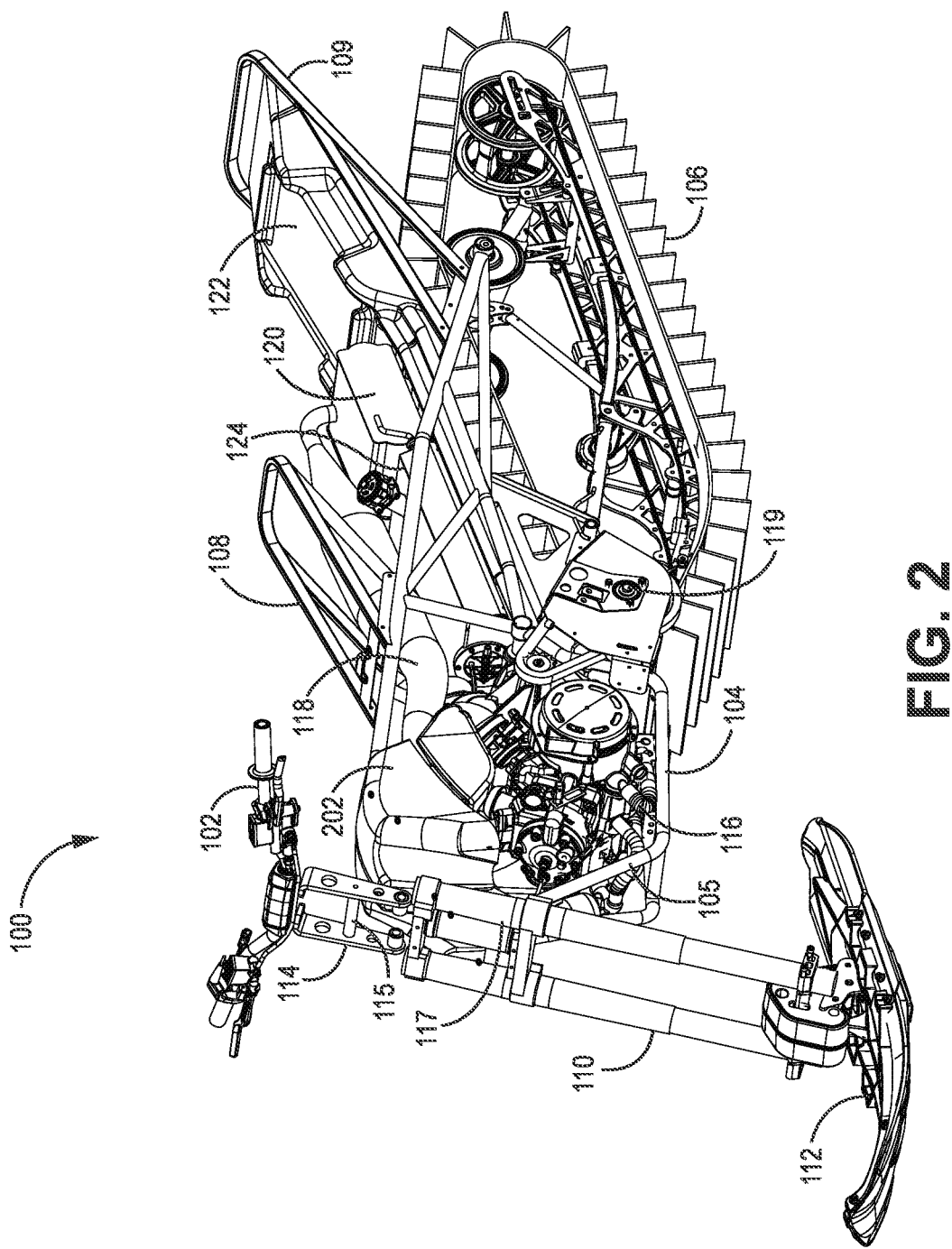
FIG. 2 illustrates a perspective view 100 of a snow vehicle with air intake system, according to some embodiments.
Figure 4:
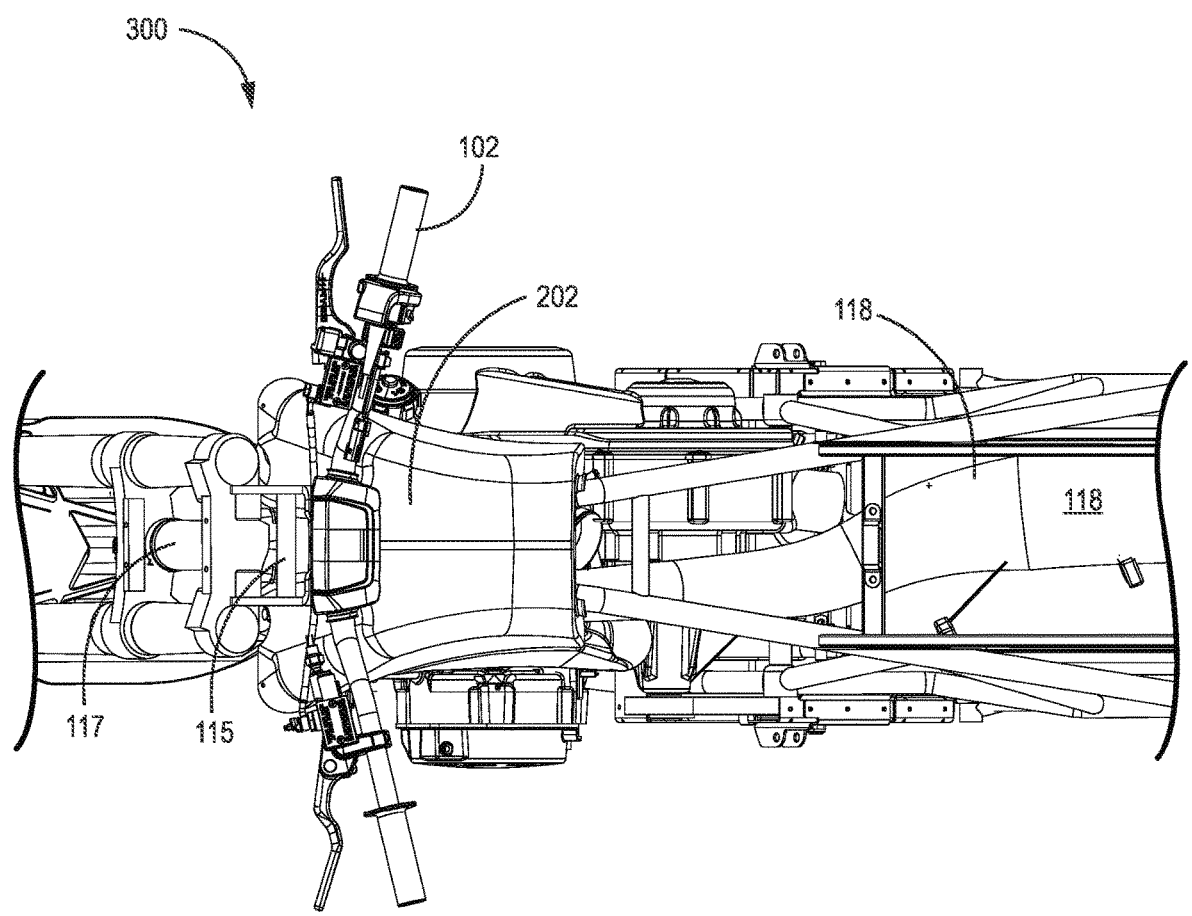
FIG. 4 illustrates a partial top-down view 300 of a snow vehicle with air intake system, according to some embodiments.
Figure 5A:
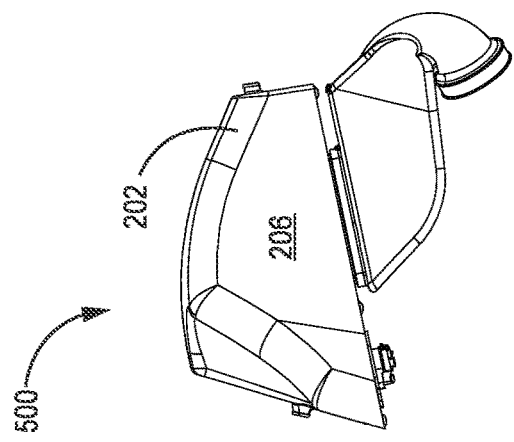
FIGS. 5A-D illustrate perspective views 500 of an air intake system, according to some embodiments.
Figure 5B:
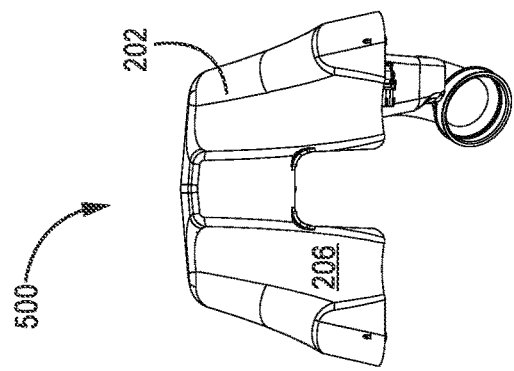
Figure 5C:
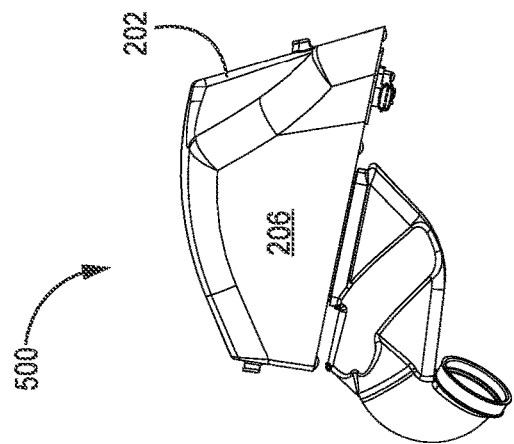
Figure 5D:
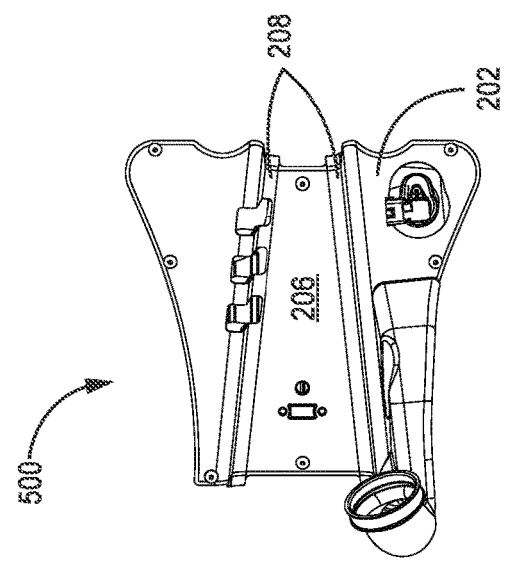

FIG. 2 additionally shows engine air intake system 202, according to some embodiments. The air intake system 202 is positioned above the motor and can be attached to frame 104 or integrated with the frame 104. Shown in FIGS. 3-4 in a partial top-down view 300, the air intake system 202 encloses the frame 104 as the tube chassis runs through the box and supports its efficient placement and space utilization. The air intake system 202 can alternatively be positioned under the frame 104.

Figure 6:
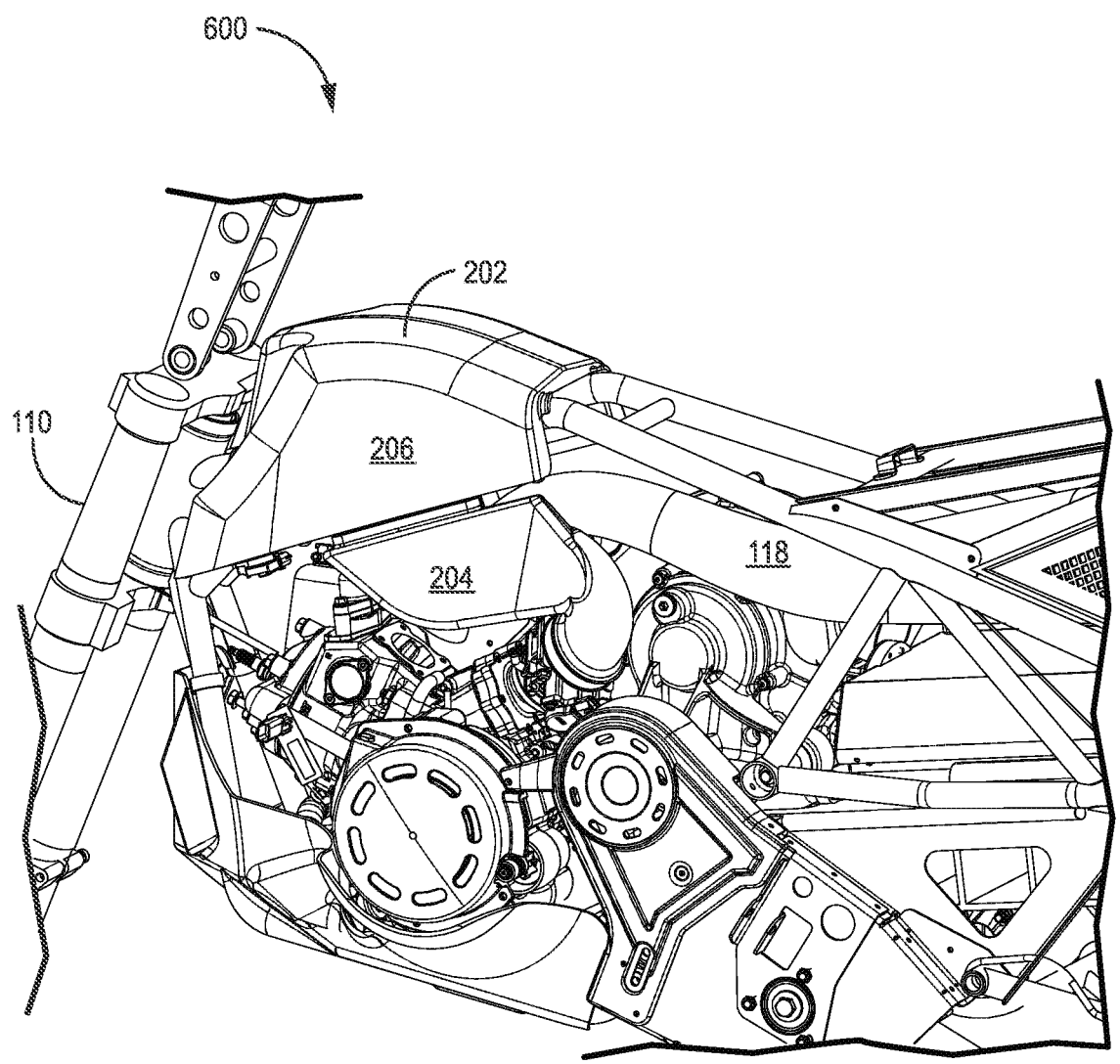
FIG. 6 illustrates a partial side view 600 of a snow vehicle with air intake system, according to some embodiments.

Referring to FIGS. 5A-D, perspective views 500 of the air intake system 202 components are shown, according to some embodiments. The air box 206 collects and funnels air as the vehicle moves. The size and position of the air box allows for a sufficient volume of air to be collected and move through the system 202 to the engine. Once collected in box 206, the air then travels through channel component 204 to the engine 116 (see view 600 of FIG. 6). Frame channels 208 can be positioned or formed on an interior or exterior surface for attachment or integration with the frame 104.

Figure 7:
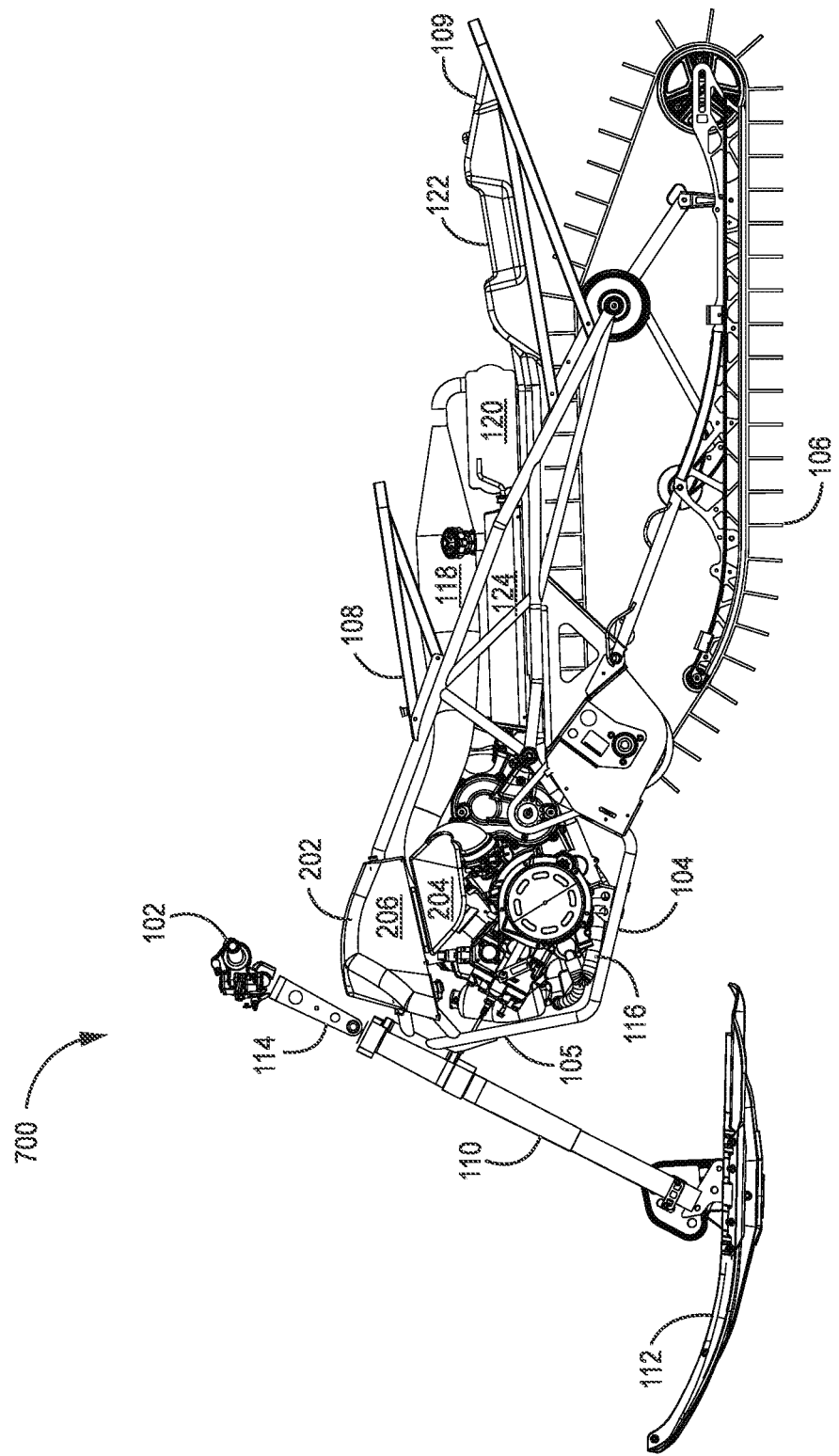
FIG. 7 illustrates a side view 700 of a snow vehicle, according to some embodiments.
Figure 20A:
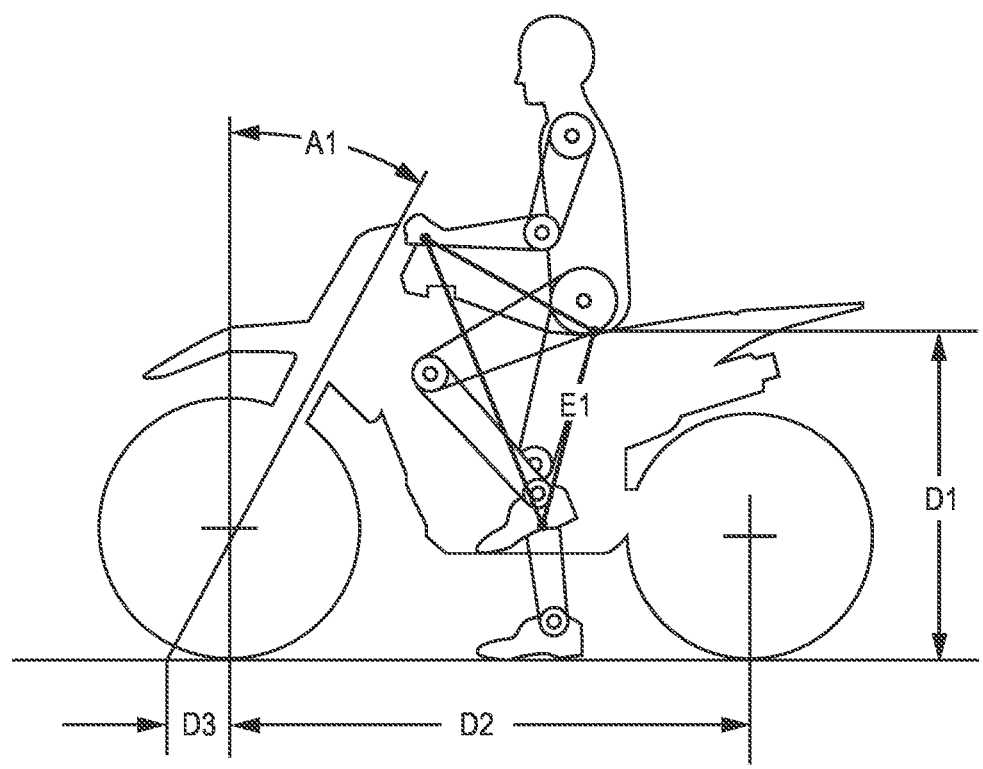
FIGS. 20A-C illustrate user or rider positioning in a dirt bike and in a snow vehicle, according to some embodiments.
Figure 20B:
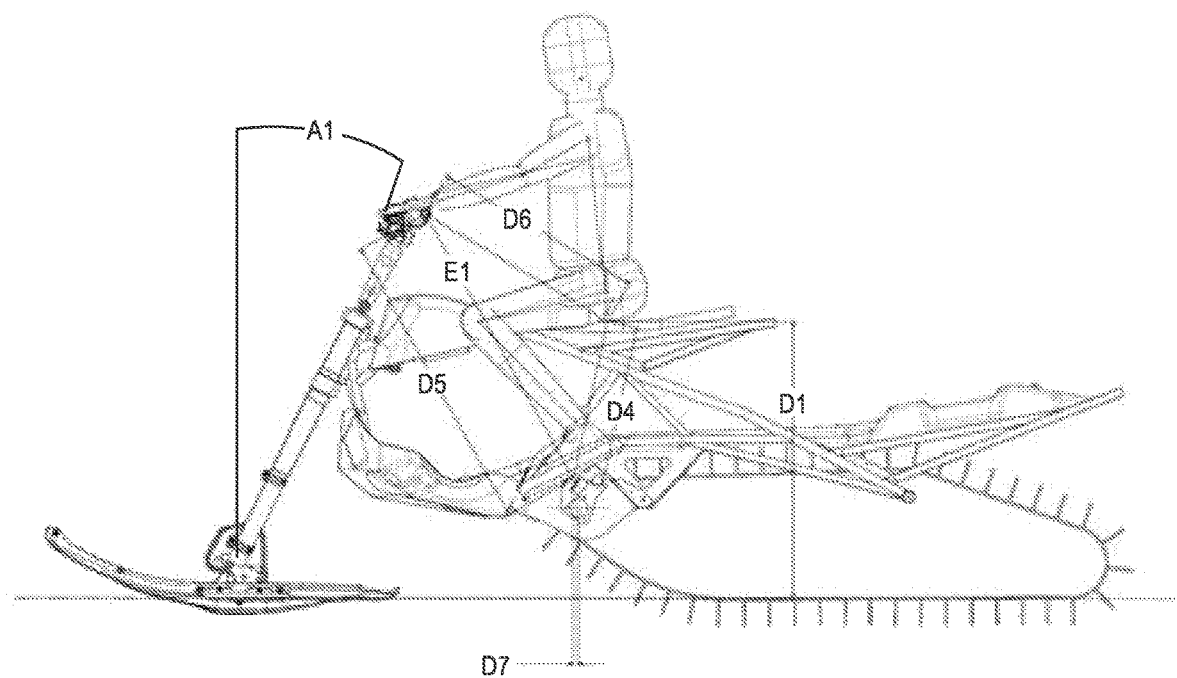
Figure 20C:
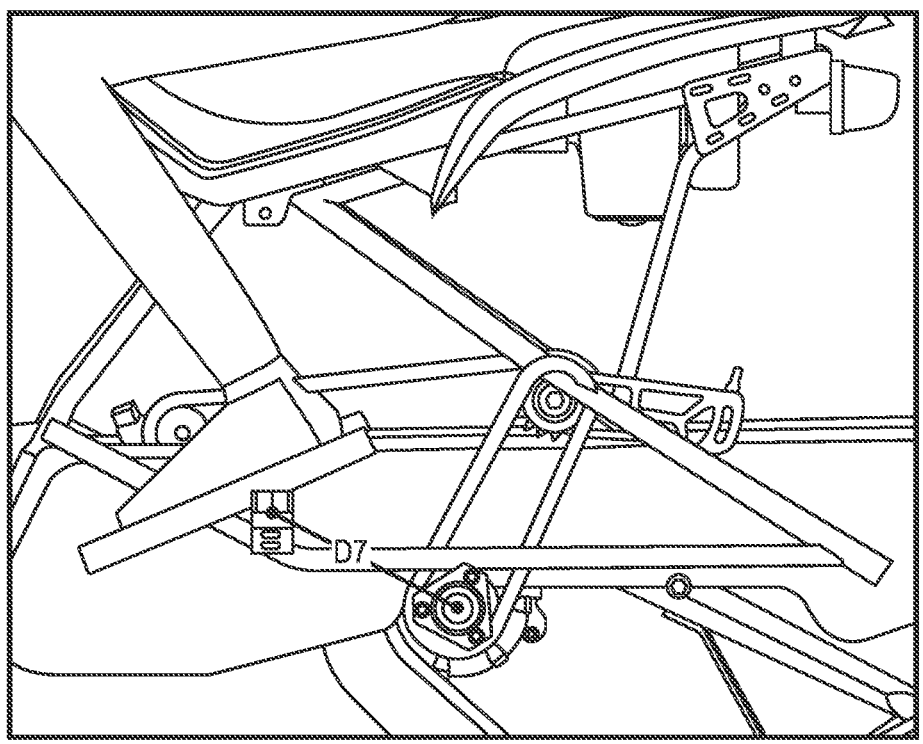

Referring to FIG. 7, a side view 700 of a snow vehicle is shown, according to some embodiments. The frame 104 can be comprised of a tube chassis that maximizes the position of vehicle components for space utilization and weight reduction. As the snow vehicle is not a kit for motorcycles, the engine 116 can be positioned much lower and forward as any consideration for the position of a wheel is not needed. The lower front frame component 105 can be much closer to fork 110 than in traditional snow bike configurations. A traditional motorcycle user or rider posture is show in FIG. 20A. The ergonomic position E1 is shown between foot peg, seat and handlebars. The angle A1 may be between about 27-30 degrees. D1 distance is about 29 inches in this example. D2 is about 48 inches and D3 about 3.2 inches. In one embodiment of the snow vehicle of the present disclosure (see FIG. 20B), a similar ergonomic position E1 is achieved. Hence, the rider or user is positioned in a similar manner with a user of a dirt bike. This differentiates from the position of a traditional snowmobile. In FIG. 20B, angle A1 can be about 24 to about 30 degrees, about 26 to about 28 degrees, or about 26.5 to about 27.5 degrees. D1 distance can be about 26 inches to about 37 inches. D1 can be about 28 inches to about 34 inches, or about 30 inches to about 33 inches for example. D6 can be about 19 inches to about 30 inches, about 22 inches to about 28 inches, or about 24 to about 26 inches. D4 can be about 15 inches to about 24 inches, about 17 inches to about 22 inches, or about 18 to about 20 inches. D5 can be about 28 inches to about 42 inches, about 32 inches to about 38 inches or about 34 inches to about 36 inches. D7 measures the distance between foot peg and track/drive shaft. Embodiments of the present invention allow for a smaller distance between the two components, as the engine 116 is positioned more forward. The track/drive shaft can even be positioned more forward than the foot peg. In motorcycles and snow kits of motorcycles, the track/drive shaft is typically about 6 to about 8 inches behind the foot peg (see D7 of FIG. 20C). In FIG. 20B, the distance D7 can be about zero inches to about 1 inch positive (foot peg ahead of the drive shaft), or about zero inches to about 1 inch negative (drive shaft ahead of the foot peg), about 2 inches positive to about 2 inches negative, about 3 inches positive to about 3 inches negative, or about 4 inches positive to about 4 inches negative.

Additionally, the frame 104 includes integrated or attached bumper 109. If attached, the bumper 109 can be bolted, welded, or otherwise fastened. If integrated, the bumper 109 can be of a continuous construction with the frame 104. The bumper 109 can connect to the shroud 122 or be separated from shroud 122. The bumper 109 can optionally support the shroud 122 at one or more connection points. As the bumper 109 is part of frame 104 or connected to frame 104, the need for a structural tunnel shroud is removed as the bumper does not need to connect to the tunnel shroud. Current shroud 122 can be made of plastic or lightweight aluminum to further reduce weight of the vehicle. The placement of the engine 116 in a forward and lower configuration advantageously moves the center of gravity of the vehicle in a lower position. The position of the one or more fuel tanks 124 further supports the lower center of gravity.

Because the frame 104 is purpose-built to for this vehicle, the size and length of the fork 110 can be reduced. The frame 104 can connect with fork 110 at a lower position. The connection between frame 104 and fork 110 can be gusset bracket 117. The gusset bracket 117 can transfer and distribute load throughout the frame 104. A drop fork component 114 can then be utilized to connect the fork 110 and handlebars 102. The drop fork component 114 is lighter than any corresponding length of fork 110 and can further be utilized for fore and aft handlebar adjustment and rotational adjustment for the user. The drop fork component 114 can include support components 115, such as a cross brace. The drop fork component 114 can be manufactured of light weight, but durable materials, such as aluminum for example. The length of the drop fork component 114 can be about 8 inches, about 10 inches, or about 12 inches. The length of the drop fork component 114 can be about 6 inches to about 12 inches. The fork 110 can also include suspension components, such as dampeners, springs, coils, etc. The front suspension can be telescoping compression dampening component or rebound dampening component, for example.

Figure 8:
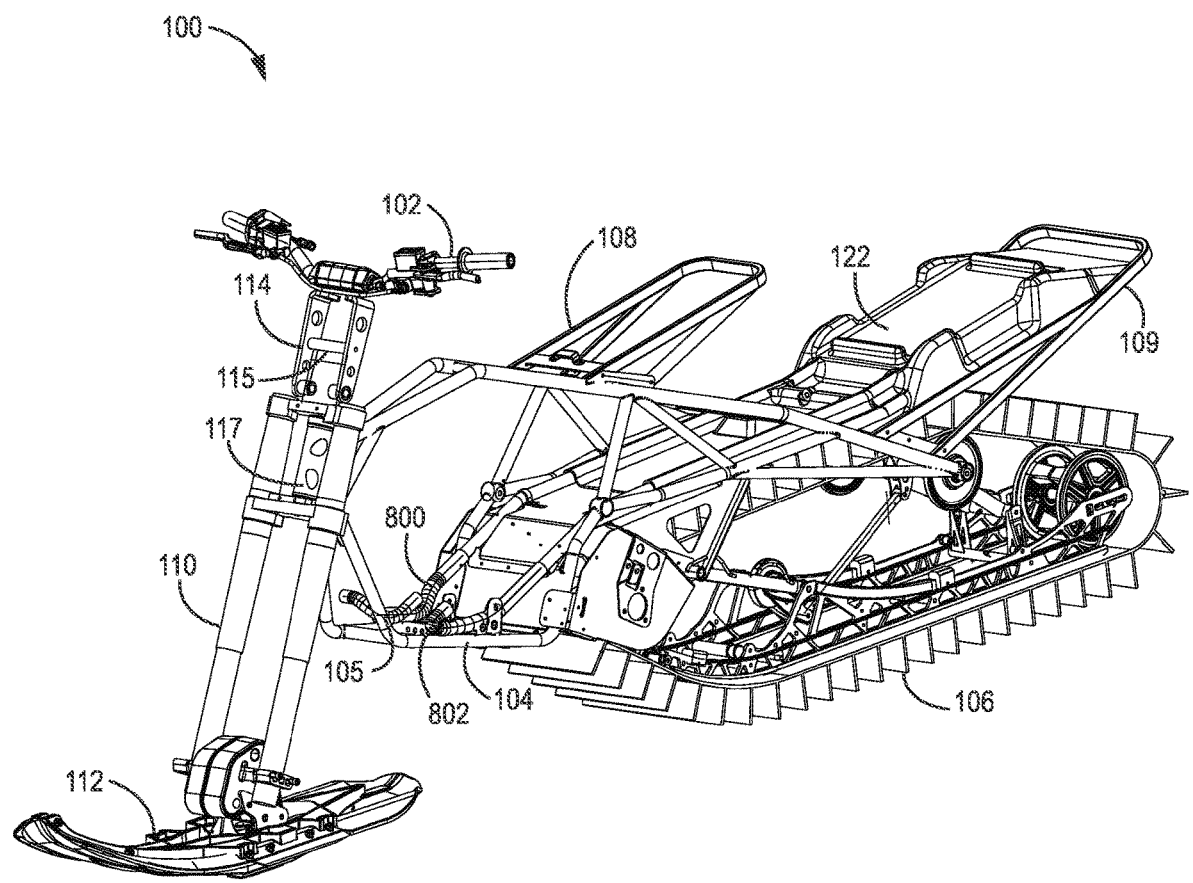
FIG. 8 illustrates a perspective view 100 of a snow vehicle with engine removed, according to some embodiments.
Figure 9:
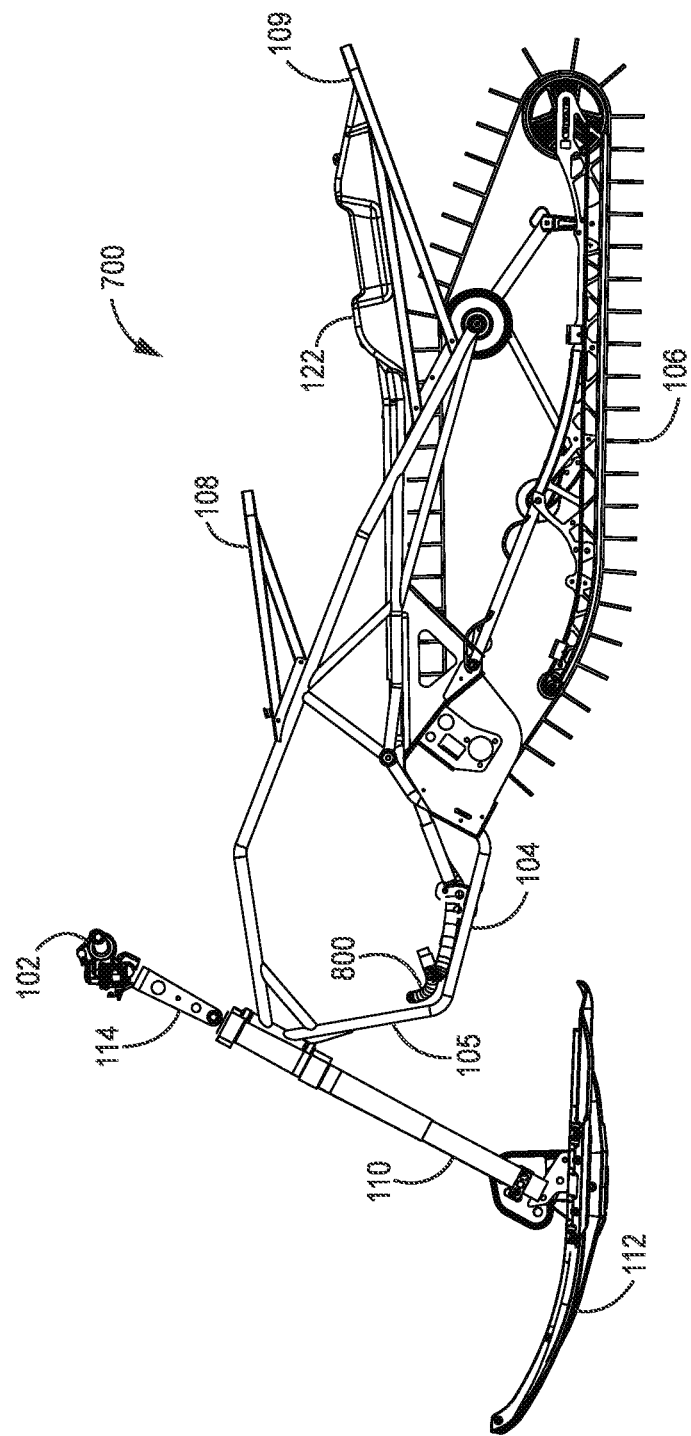
FIG. 9 illustrates a side view 700 of a snow vehicle with engine removed, according to some embodiments.
Figure 10:
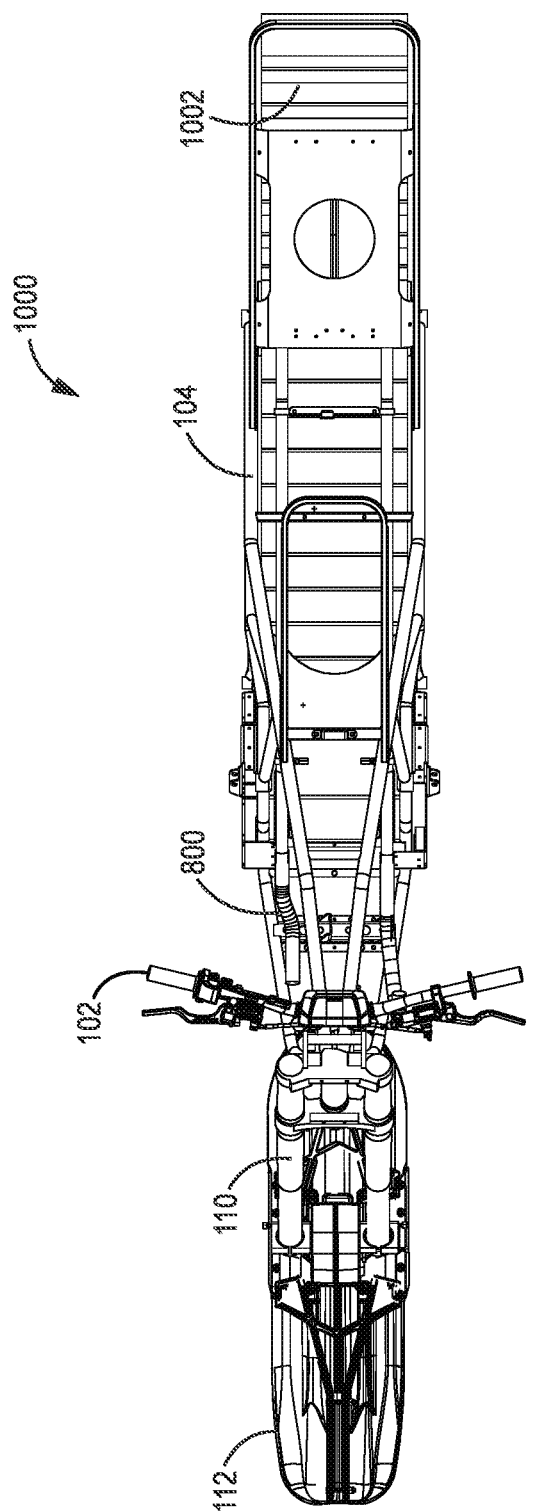
FIG. 10 illustrates a top-down view 1000 of a snow vehicle with cooling system, according to some embodiments.
Figure 11B:
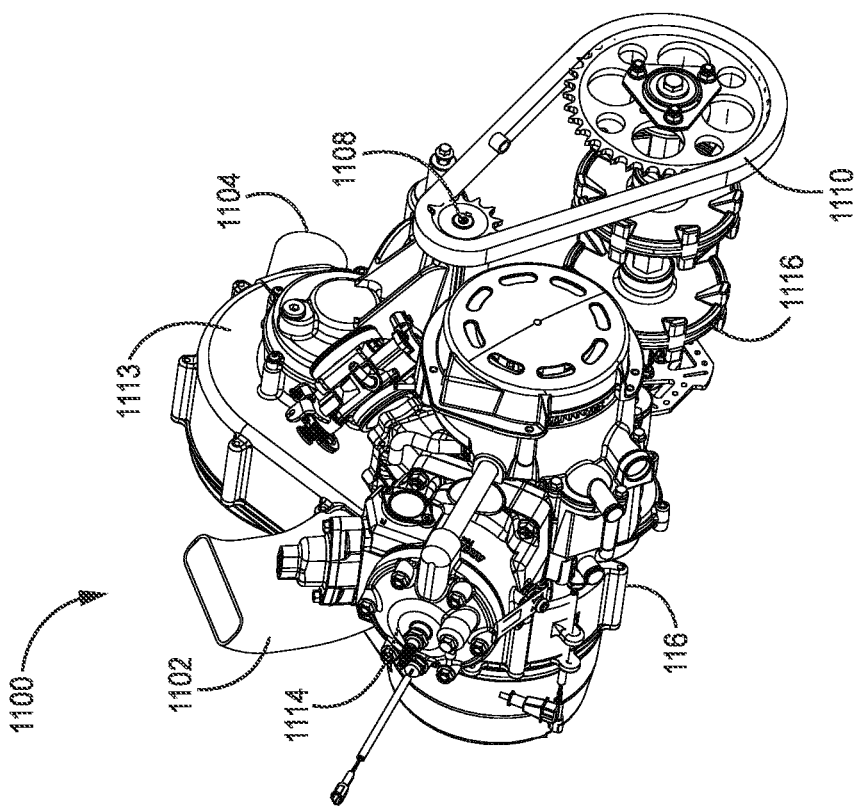
FIGS. 11A-B illustrate perspective views 1100 of power train components, according to some embodiments.
Figure 11A:
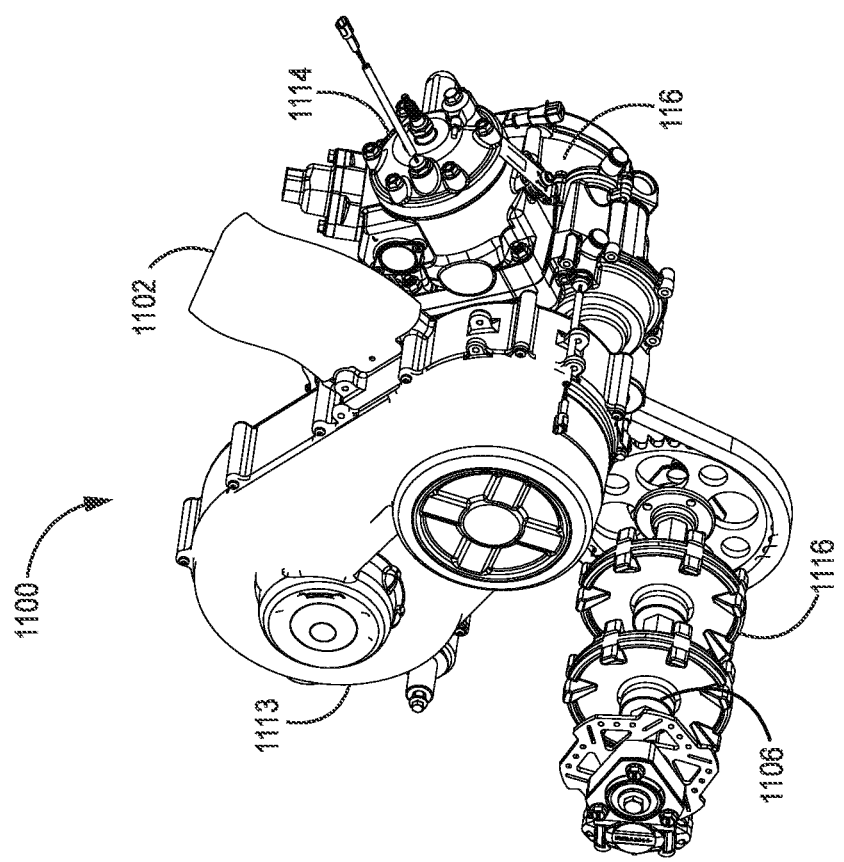
Figure 12D:
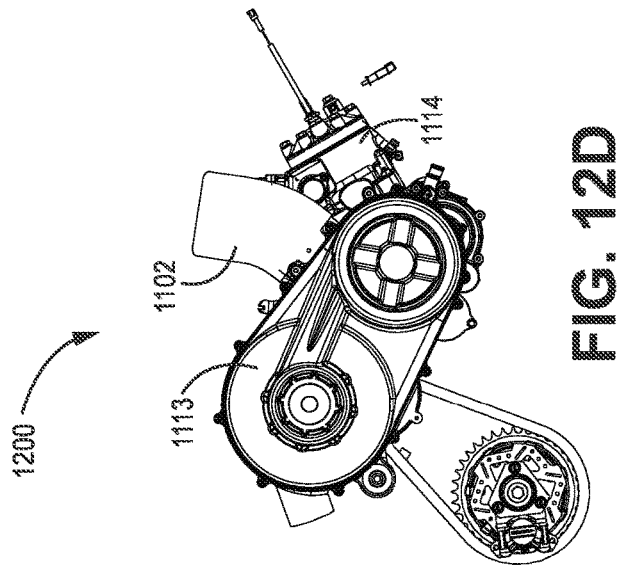
FIGS. 12A-D illustrate perspective views 1200 of power train components, according to some embodiments.
Figure 12A:
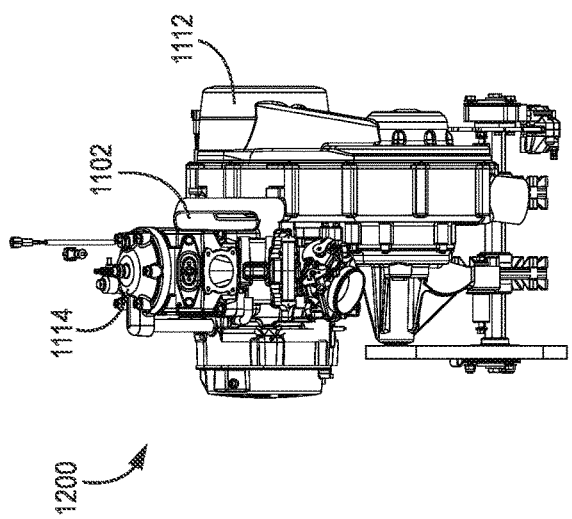
Figure 12C:
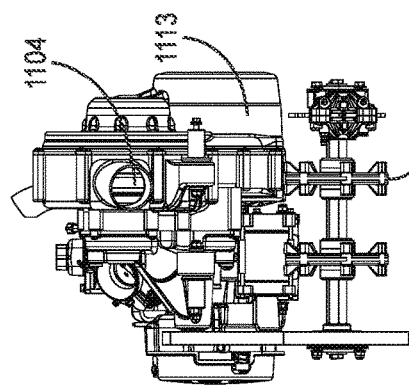
Figure 12B:
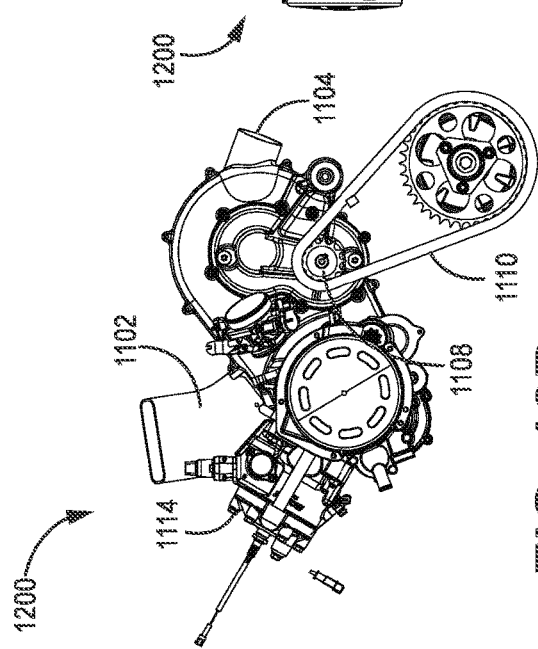
Figure 14:
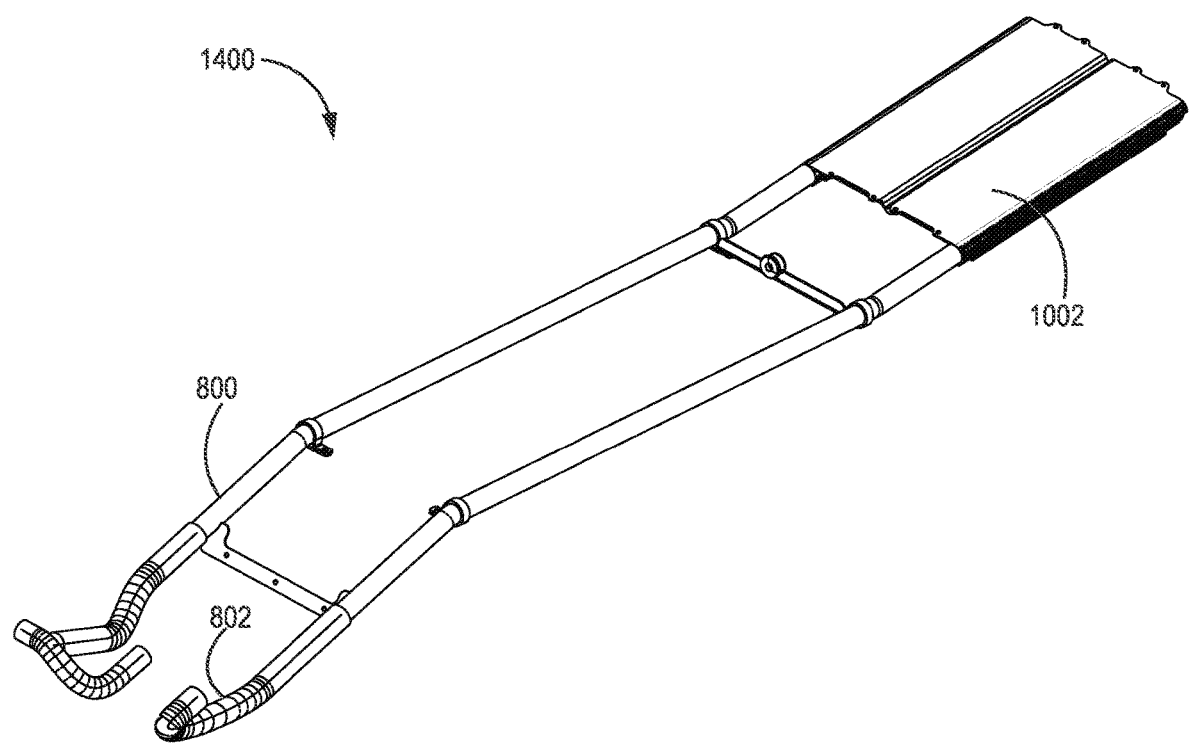
FIG. 14 illustrates a perspective view 1400 of a cooling system, according to some embodiments.
Figure 15:
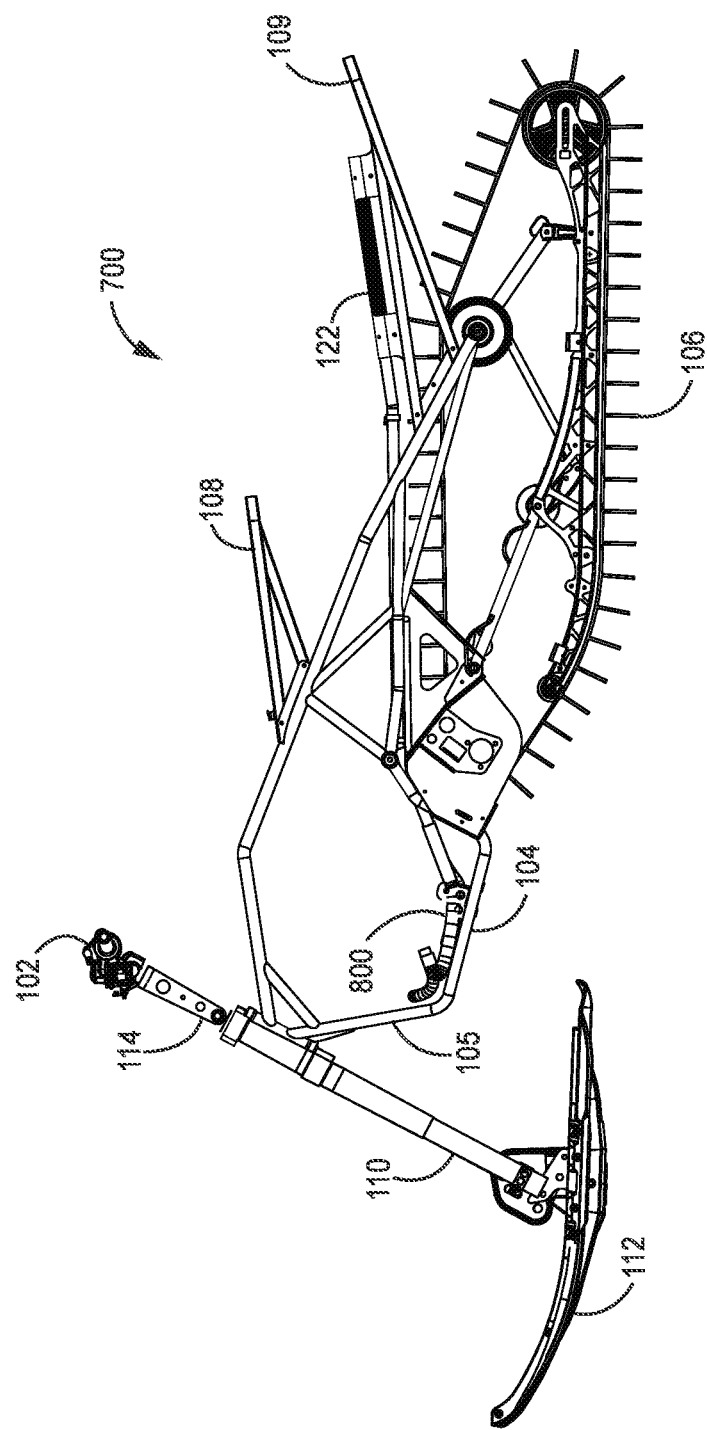
FIG. 15 illustrates a side view 700 of a snow vehicle with engine removed and with a cooling system, according to some embodiments.
Figure 16:
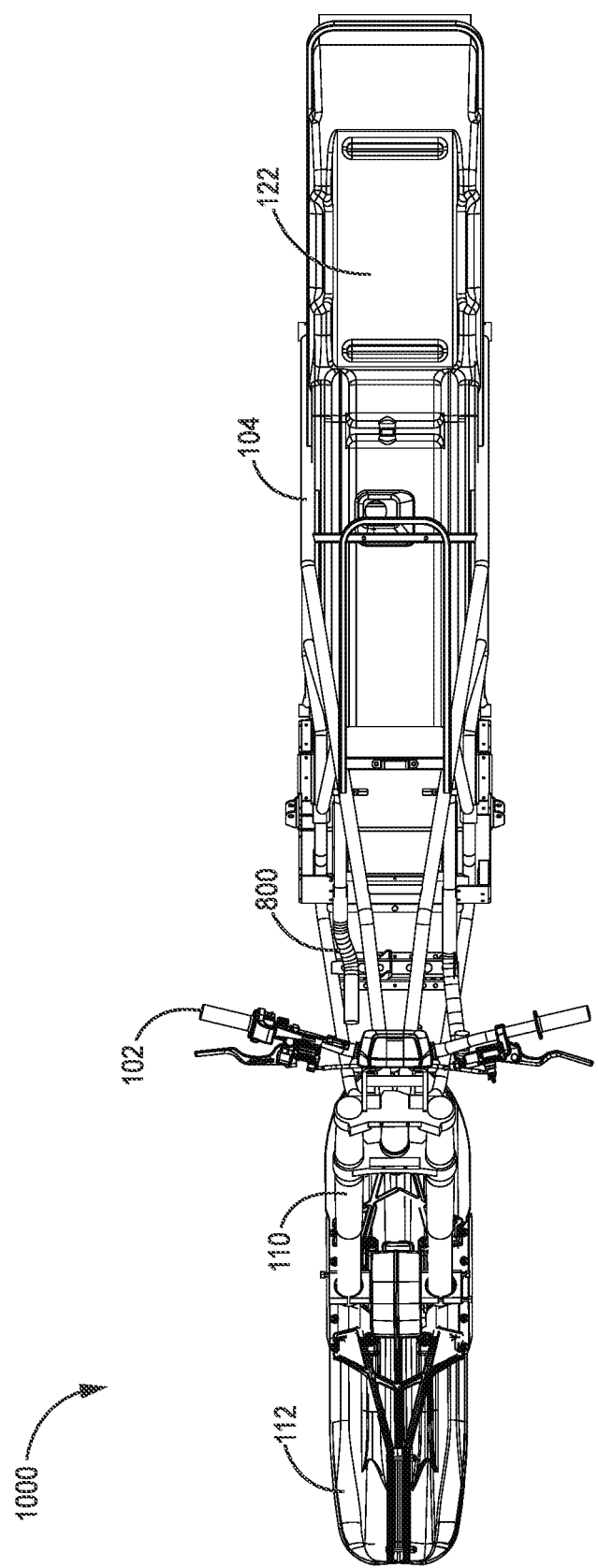
FIG. 16 illustrates a top-down view 1000 of a snow vehicle tunnel shroud, according to some embodiments.

Referring to FIG. 8, a perspective view 100 of a snow vehicle with engine 116 removed and with cooling system 800 is shown, according to some embodiments. With the engine 116 removed from view, the cooling system 800 can be seen. The cooling lines 802 connect to the engine 116, and a pump (not shown) moves coolant to heat exchanger 1002 (see view 1400 of FIG. 14). The tunnel shroud 122 (see top view 1000 of FIG. 16) covers the heat exchanger 1002 (see view 700 of FIG. 15 and top view 1000 of FIG. 10) and deflects snow onto the exchanger 1002 to assist in cooling the liquid coolant (see view 700 of FIG. 9). As discussed above, the tunnel shroud 122 can be manufactured of light weight materials, such as plastic or aluminum as the need for structural support has been removed by integrating such function into frame 104. The shroud 122 can be vacuum formed, molded, or shaped into various shapes or configurations for snow deflection functionality and aesthetic considerations.

Figure 13:
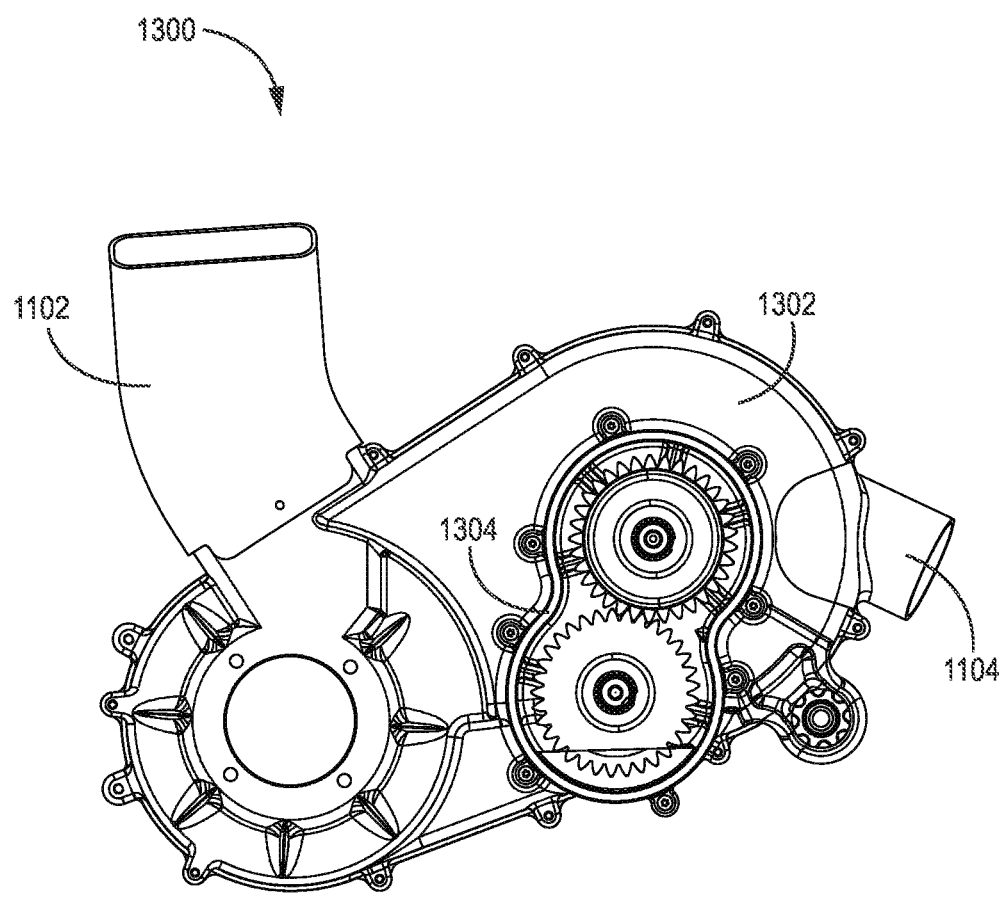
FIG. 13 illustrates a side view 13 of a continuously variable transmission (CVT) housing with air handling components and drop box, according to some embodiments.

Referring to FIGS. 11A-B, 12A-D perspective views 1100, 1200 of power train components are shown, according to some embodiments. The drive train of the snow vehicle includes a continuously variable transmission (CVT), for transferring power from the engine 116 to the drive track 106. The use of an automatic transmission makes for a smoother user experience and handling as compared to manual transmission. An engine 116 converts chemical energy to mechanical energy via a rotating input shaft in contact with a transmission or drive train, such as a CVT. The CVT housing 1112 includes a rotatable drive (or primary) clutch connected to the input shaft. The CVT also includes a rotatable driven (or secondary) clutch connected to an output shaft or jack shaft 1108, the driven clutch having a laterally stationary sheave and a laterally movable sheave that is normally biased toward the stationary sheave. An endless flexible drive belt is disposed about the drive and driven clutches. Typically, the CVT transmission is connected to the output shaft 1108 of the vehicle's engine, the transmission providing continuously variable gear reduction from the relatively higher rotation speed of the engine to the relatively lower rotation speed of the vehicle drive axle. The CVT 1113 is used in conjunction with or integrated with a gear or drop box 1302 (see view 1300 of FIG. 13), for correcting the rotation of the output shaft 1108 due to the position of the engine. The drop box 1302 can include two or more gears 1304. The CVT housing 1112 with drop box 1302 is connected to the jack shaft 1108. Power is transferred via a belt 1110 from the jack shaft 1108 to driveshaft 1106, connected by suitable linkages (sprockets 1116, for example) to the drive track 106.

The endless, flexible, generally V-shaped drive belt is disposed about the clutches within housing 1112. Each of the clutches has a pair of complementary sheaves, one of the sheaves being laterally movable with respect to the other. The effective gear ratio of the transmission is determined by the positions of the movable sheaves in each of the clutches. The secondary driven clutch has its sheaves normally biased together (e.g., by a torsion spring working in combination with a helix-type cam, as described below), so that when the engine is at idle speeds the drive belt rides near the outer perimeter of the driven clutch sheaves.

The spacing of the sheaves in the primary drive clutch usually is controlled by centrifugal flyweights As the drive clutch rotates faster (in response to increased engine rpm) the flyweights urge the movable sheave toward the stationary sheave. This pinches the drive belt, causing the belt to begin rotating with the drive clutch, the belt in turn causing the driven clutch to begin to rotate. Further movement of the drive clutch's movable sheave toward the stationary sheave forces the belt to climb outwardly on the drive clutch sheaves, increasing the effective diameter of the drive belt path around the drive clutch. Thus, the spacing of the sheaves in the drive clutch changes based on engine rpm. The clutch therefore can be said to be speed sensitive.

As the sheaves of the drive clutch pinch the drive belt and force the belt to climb outwardly on the drive clutch sheaves, the belt (not being stretchable) is pulled inwardly between the sheaves of the driven clutch, decreasing the effective diameter of the drive belt path around the driven clutch. This movement of the belt inwardly and outwardly on the drive and driven clutches smoothly changes the effective gear ratio of the transmission in infinitely variable increments.

The CVT housing 1112 includes air handling components (e.g., ducting) to cool the operation of the CVT. Intake 1102 brings air into the housing and exit port 1104 releases the heated air from the housing 1112. The intake 1102 can face a perpendicular direction to vehicle travel, face a parallel direction to vehicle travel, or face angles in between perpendicular and parallel vehicle travel, so long as sufficient air is gathered and moved through the handling system to cool the CVT.

In the present example, the engine 116 is shown with a single, two-stroke cylinder 1114. The single cylinder, two-stroke engine provides durability, simplicity, and lighter weight to the vehicle. Four-stroke engines and multi-cylinder two-stroke engines can also be used, but at the possible sacrifice of weight and size.

Figure 17:
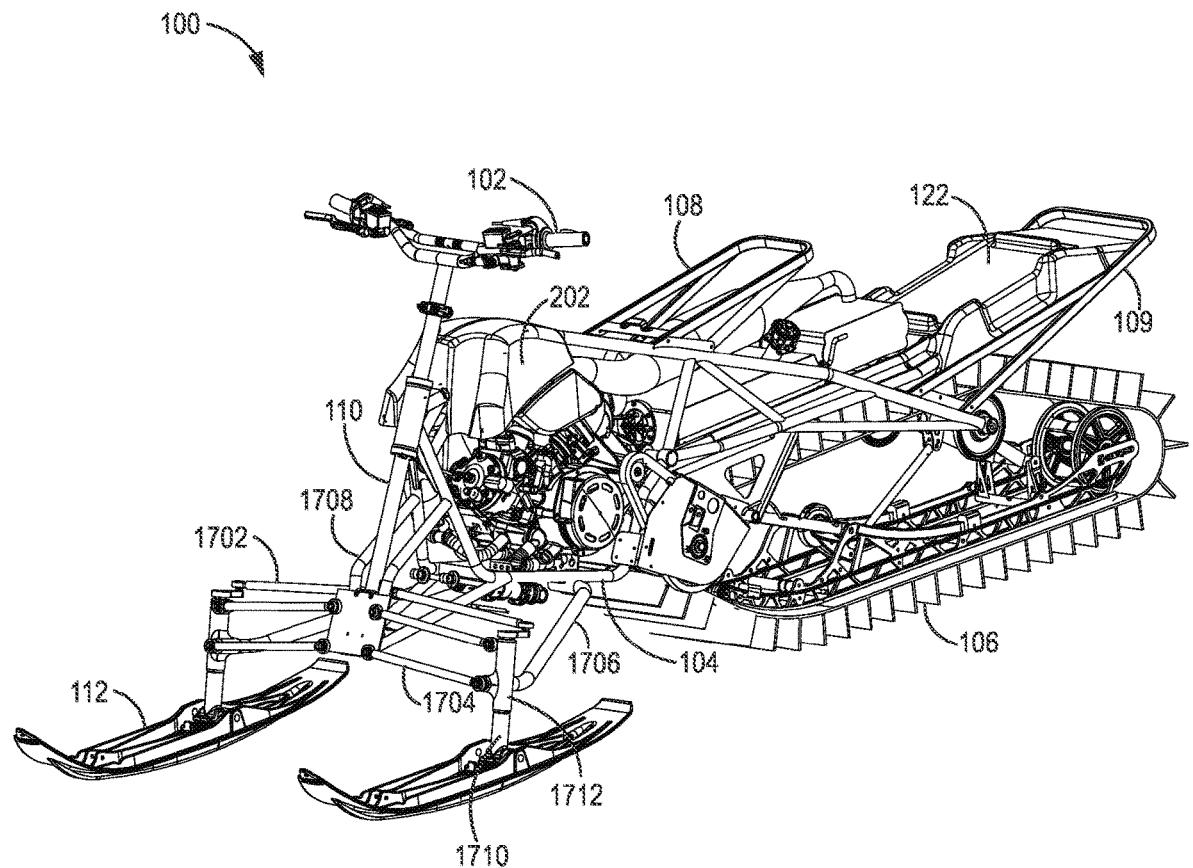
FIG. 17 illustrates a perspective view 100 of a snow vehicle with two-ski configuration, according to some embodiments.
Figure 18:
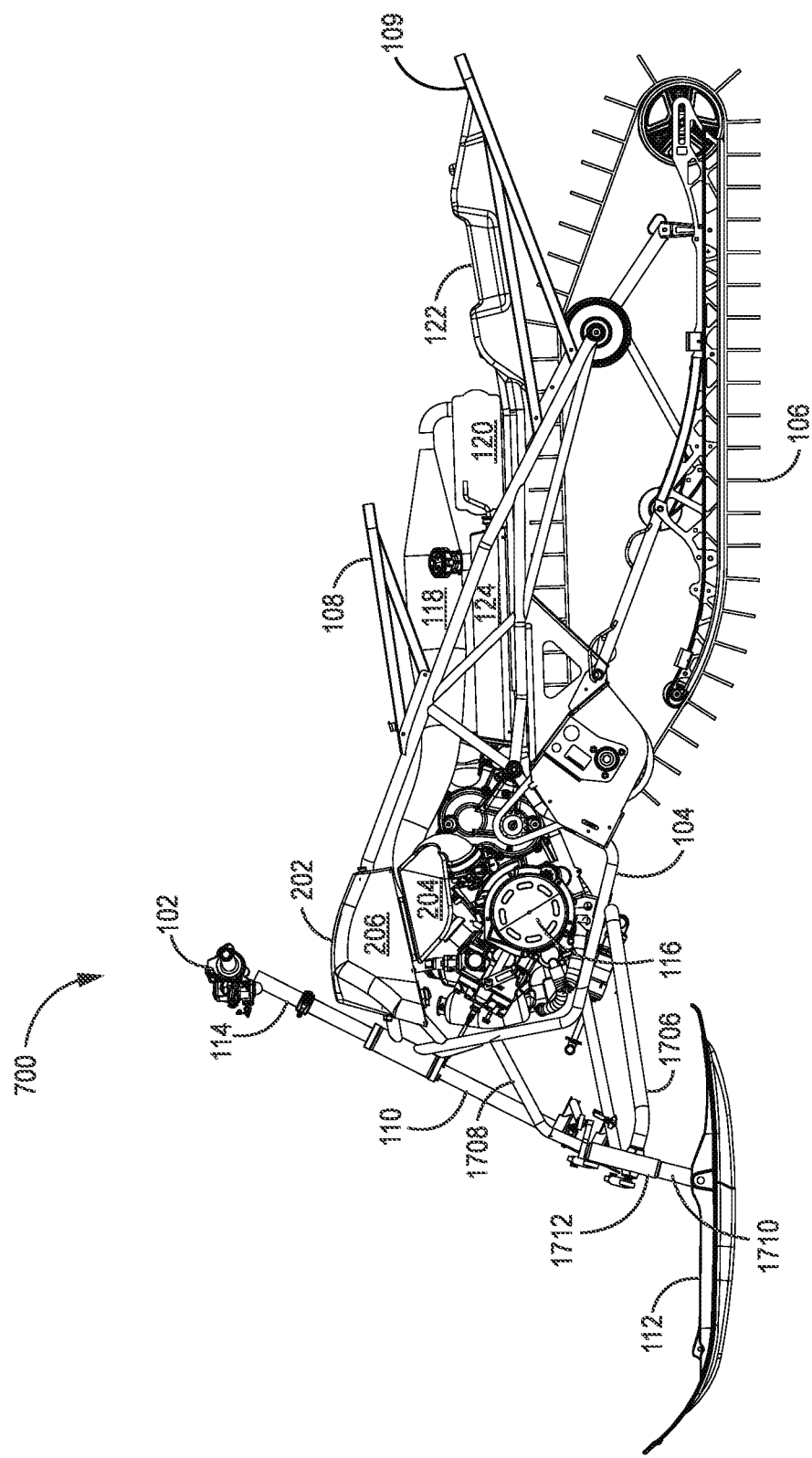
FIG. 18 illustrates a side view 700 of a snow vehicle with two-ski configuration, according to some embodiments.
Figure 19:
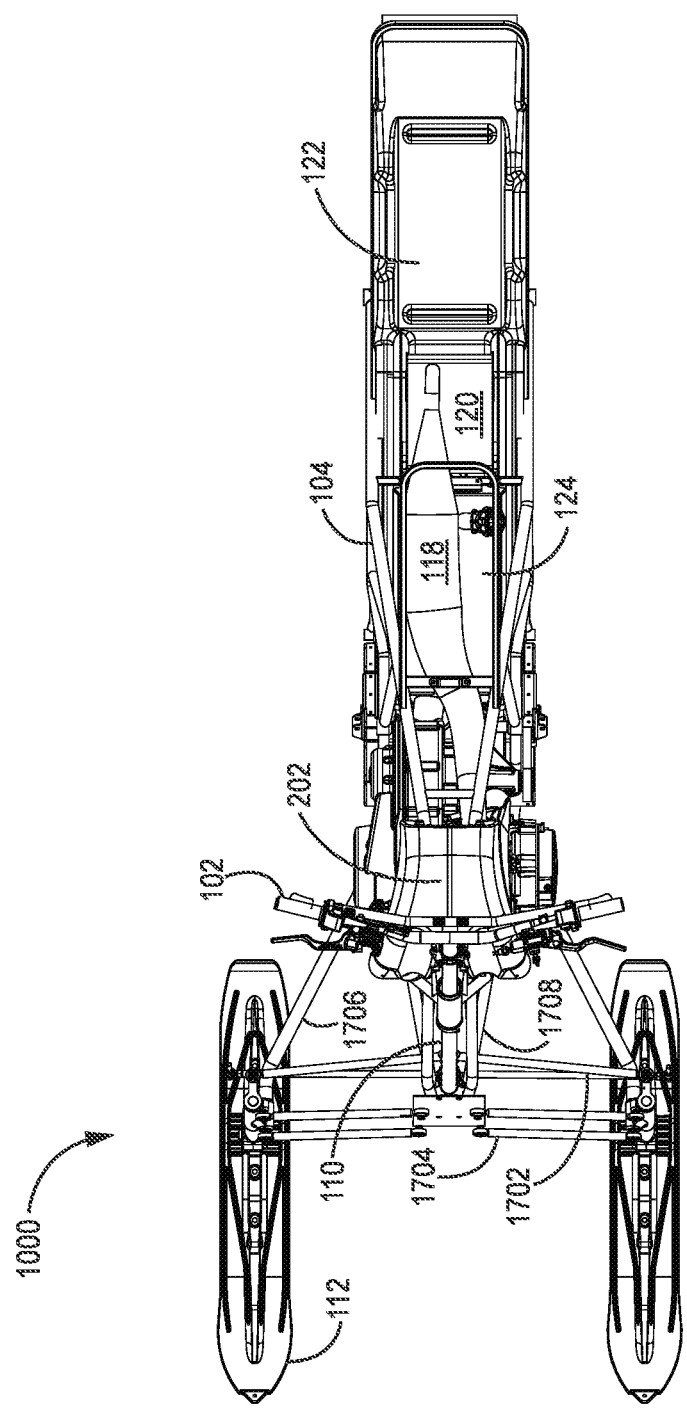
FIG. 19 illustrates a top-down view 1000 of a snow vehicle with two-ski configuration, according to some embodiments.

Referring to FIG. 17, a perspective view 100 of a snow vehicle with a two-ski configuration is shown, according to some embodiments. In place of a motorcycle-type fork, a single tube fork connection and accompanying suspension can be utilized to provide a two-ski configuration as an optional kit in place of the single ski configuration. A side view 700 (see FIG. 18) and top down view 1000 (see FIG. 19) are also shown. The two-ski configuration would allow for a snow bike feel, with increased stability and balance.

A front suspension subframe assembly 1708 connects with the frame 104. Steering mechanism 1702 connects with the handlebars 102 and steering shaft 1710, positioned within each spindle 1712. The spindle 1712 connects with each ski 112. A trailing arm 1706 connects with the frame and each spindle 1712. Radius arms 1704 connect with the spindles 1712 and subframe assembly 1708. Dampening components, such as shocks, springs, coils (not shown), can be attached to the subframe assembly 1708 and spindles 1712, for example.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus, the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A snow bike, comprising:
    an engine, mounted on a frame;
    a drive track in contact with the frame;
    a drive train operatively interconnecting the engine with the drive track for delivering propulsive power to the drive track;
    a fork rotatably connected to the frame;
    a ski connected to the fork;
    handlebars connected to the fork by a drop fork component;
    an exhaust port, in contact with the engine and facing a rearward direction;
    an exhaust system connected to the exhaust port; and
    a fuel tank mounted to the frame and positioned below the exhaust system.

2. The snow bike of claim 1, further comprising a seat frame attached to the frame, wherein the fuel tank is positioned below the seat frame.

3. The snow bike of claim 2, wherein the fuel tank is located rearward of the engine on the frame providing a low center of gravity for the snow bike.

4. The snow bike of claim 1, wherein the fuel tank is mounted on the frame in a location rearward of the engine.

5. The snow bike of claim 1, wherein the fork comprises two parallel tubes.

6. The snow bike of claim 1, comprising an additional ski connected to the fork.

7. The snow bike of claim 1, wherein the engine is positioned on the frame in a location that provides a lower center of gravity of the snow bike.

* * * * *